(12) United States Patent
Oshima

(10) Patent No.: US 7,778,542 B2
(45) Date of Patent: Aug. 17, 2010

(54) IMAGE CAPTURING APPARATUS

(75) Inventor: Shintaro Oshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 11/762,994

(22) Filed: Jun. 14, 2007

(65) Prior Publication Data

US 2007/0292126 A1 Dec. 20, 2007

(30) Foreign Application Priority Data

Jun. 20, 2006 (JP) ............................. 2006-170579

(51) Int. Cl.
*G03B 7/00* (2006.01)
*B60R 1/06* (2006.01)

(52) U.S. Cl. ..................... 396/236; 359/507; 348/340

(58) Field of Classification Search ................. 396/425, 396/456, 463, 489, 236; 348/335, 340, 207.99; 359/507
See application file for complete search history.

(56) References Cited

U.S. PATENT DOCUMENTS

2002/0093577 A1* 7/2002 Kitawaki et al. ............ 348/241
2004/0012714 A1* 1/2004 Kawai .......................... 348/374
2005/0088563 A1* 4/2005 Ito et al. ....................... 348/335
2005/0280712 A1* 12/2005 Kawai .................... 348/207.99

FOREIGN PATENT DOCUMENTS

JP 2002-204379 7/2002

* cited by examiner

*Primary Examiner*—Christopher E Mahoney
*Assistant Examiner*—Autumn Parker
(74) *Attorney, Agent, or Firm*—Cowan, Liebowitz & Latman, P.C.

(57) ABSTRACT

This invention can efficiently remove, within a short period of time, a foreign substance such as dust adhering on an optical element arranged on the front surface of an image sensor. An image capturing apparatus includes an image sensor which photo-electrically converts an object image, an optical element inserted between the image sensor and a photographing optical system which forms the object image, a foreign substance position storage unit which stores the position of a foreign substance adhering on the surface of the optical element, a vibration unit which vibrates the optical element to remove the foreign substance adhering on the surface of the optical element, and a control unit which controls a driving parameter of the vibration unit on the basis of the foreign substance position information stored in the foreign substance position storage unit.

5 Claims, 15 Drawing Sheets

410

410

410

410

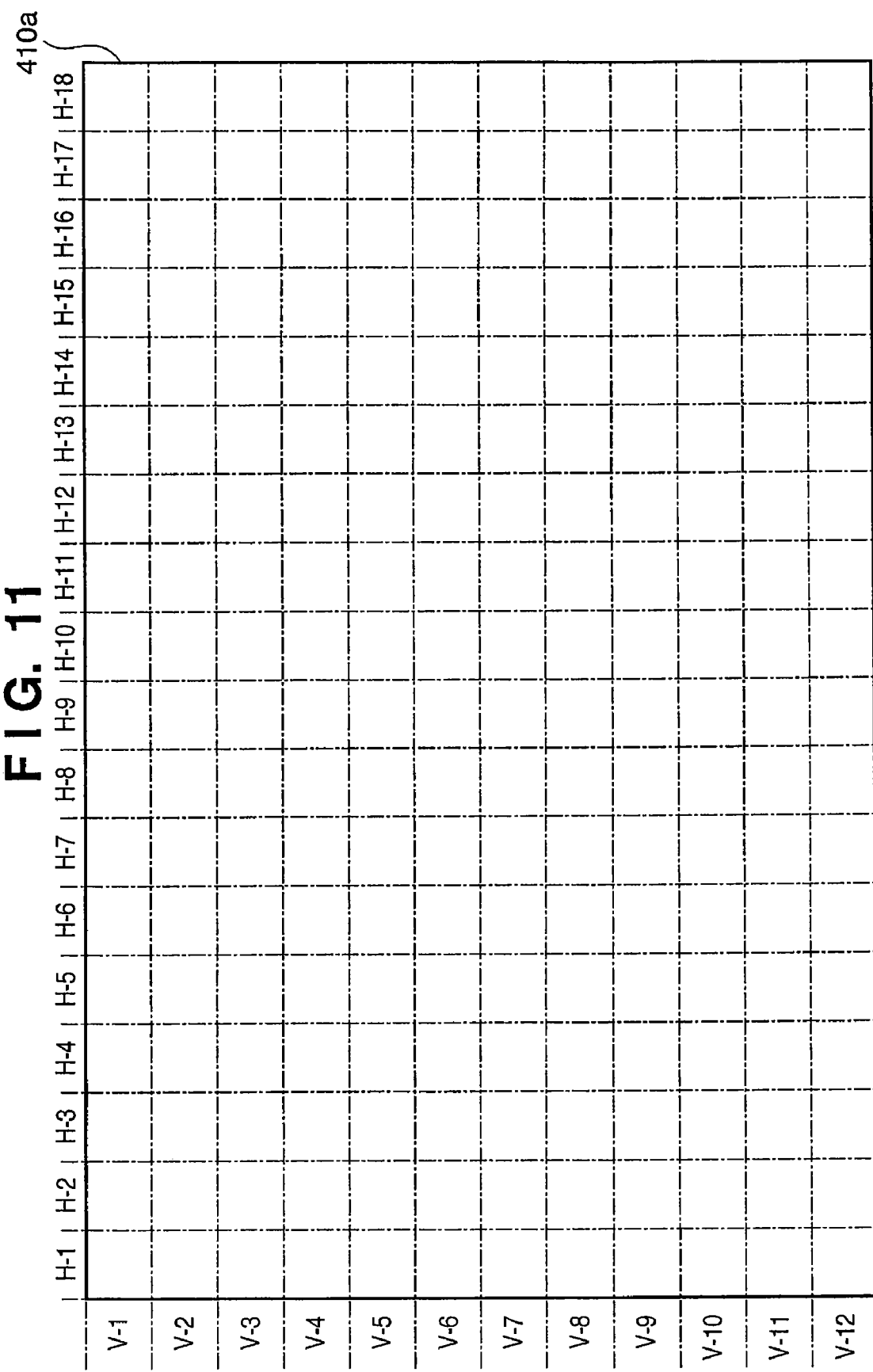

| V(V) | |
|---|---|
| V1 | 30 |
| V2 | 40 |
| V3 | 50 |
| V4 | 60 |

F I G. 12A

| f(KHz) | |
|---|---|
| f1 | 20 |
| f2 | 50 |
| f3 | 80 |
| f4 | 100 |
| f5 | 130 |

F I G. 12B

| θ(rad) | |
|---|---|
| θ1 | 0 |
| θ2 | 90 |
| θ3 | 180 |
| θ4 | 270 |

F I G. 12C

| REGION | Dmax | Gmax |
|---|---|---|
| H-1, V-1 | V1, f4, θ1 | V3, f1, θ1 |
| H-1, V-2 | V1, f4, θ3 | V3, f1, θ3 |
| H-1, V-3 | V2, f4, θ1 | V4, f1, θ1 |
| H-1, V-4 | V2, f4, θ3 | V4, f1, θ3 |
| H-1, V-5 | V1, f5, θ1 | V3, f2, θ1 |
| H-1, V-6 | V1, f5, θ3 | V3, f2, θ3 |
| H-1, V-7 | V2, f5, θ1 | V4, f2, θ1 |
| H-1, V-8 | V2, f5, θ3 | V4, f2, θ3 |
| H-1, V-9 | V3, f5, θ1 | V4, f5, θ1 |
| H-1, V-10 | V3, f5, θ3 | V4, f5, θ3 |
| . | . | . |
| . | . | . |
| . | . | . |
| H-18, V-3 | V3, f5, θ3 | V4, f5, θ3 |
| H-18, V-4 | V3, f5, θ1 | V4, f5, θ1 |
| H-18, V-5 | V2, f5, θ3 | V4, f2, θ3 |
| H-18, V-6 | V2, f5, θ1 | V4, f2, θ1 |
| H-18, V-7 | V1, f5, θ3 | V3, f2, θ3 |
| H-18, V-8 | V1, f5, θ1 | V3, f2, θ1 |
| H-18, V-9 | V2, f4, θ3 | V4, f1, θ3 |
| H-18, V-10 | V2, f4, θ1 | V4, f1, θ1 |
| H-18, V-11 | V1, f4, θ3 | V3, f1, θ3 |
| H-18, V-12 | V1, f4, θ1 | V3, f1, θ1 |

F I G. 12D

IMAGE CAPTURING APPARATUS

BACKGROUND OF THE INVENTION

1. Field of the Invention

The present invention relates to a technique for removing a foreign substance such as dust adhering on the surface of an optical member such as an image sensor or optical filter which is built in, e.g., a single-lens reflex digital camera and arranged on the focal plane or near the focal plane.

2. Description of the Related Art

As a conventional problem, if a foreign substance such as dust exists near the focal plane of the photographing lens of a single-lens reflex digital camera of a lens interchangeable type, the image sensor senses the shadow of the foreign substance.

Such dust is thought to enter from the outside upon lens interchange or be fine abrasion powder of, e.g., a resin or metal serving as the structural member of the shutter or mirror as it operates in the camera. The dust generated due to these factors sometimes enters especially between a cover glass for protecting the image sensor and an optical filter such as an infrared cut filter or optical low-pass filter arranged on the front surface of the cover glass. To remove the dust, it is necessary to disassemble the camera. Hence, it is very effective to form a sealed structure to prevent the dust from entering between the cover glass and optical filter of the image sensor.

However, another problem still remains unsolved. That is, if dust adheres on the surface of the optical filter on the opposite side (lens side) of the image sensor side close to the focal plane, the image sensor senses the shadow of the dust. To solve this problem, there is proposed a structure in which an optical filter capable of vibration is arranged on the front surface of the image capturing unit (Japanese Patent Laid-Open No. 2002-204379). A piezoelectric element vibrates this optical filter to remove the dust adhering on the optical filter. The camera structure as disclosed in Japanese Patent Laid-Open No. 2002-204379 can remove the dust adhering on the outermost surface of the dustproof structure (e.g., the surface of the optical filter) without detaching the lens and disassembling the camera.

Unfortunately, the above-described conventional dust removal mechanism poses the following problems.

That is, the dust particles adhering on the optical filter varies in size, composition, and shape, and position on the optical filter, where these dust particles are likely to adhere cannot be predicted. For this reason, the conventional dust removal mechanism sometimes fails to sufficiently remove the dust depending on, e.g., its size and adhesion position.

In addition, since the piezoelectric element itself for generating vibration is displaced only slightly, the conventional dust removal mechanism sometimes fails to efficiently remove the dust even by vibrating the optical filter using the displacement amount of the piezoelectric element alone. To increase the vibration amplitude of the optical filter, it is generally necessary to vibrate the optical filter at its natural resonance frequency. Applying a high voltage to the piezoelectric element also makes it possible to increase the displacement amount of the piezoelectric element so that vibration having a larger amplitude acts on the optical filter. However, an attempt to efficiently remove dust particles that take various forms leads to an increase in the apparatus size. At the same time, such attempt increases energy consumption by the power supply and prolongs the removal operation time.

SUMMARY OF THE INVENTION

The present invention has been made in consideration of the above problems, and has as its object to make it possible to efficiently remove, within a short period of time, a foreign substance such as dust adhering on an optical element arranged on the front surface of an image sensor.

In order to solve the above problems and achieve the above object, an image capturing apparatus according to the present invention comprises an image sensor which photo-electrically converts an object image, an optical element inserted between the image sensor and a photographing optical system which forms the object image, a foreign substance position storage unit which stores a position of a foreign substance adhering on a surface of the optical element, a vibration unit which vibrates the optical element to remove the foreign substance adhering on the surface of the optical element, and a control unit which controls a driving parameter of the vibration unit on the basis of the foreign substance position information stored in the foreign substance position storage unit.

Further features of the present invention will become apparent from the following description of exemplary embodiments with reference to the attached drawings.

BRIEF DESCRIPTION OF THE DRAWINGS

FIG. 11 is a view showing the state in which the light-receiving range of the optical filter is divided in the horizontal and vertical directions;

FIGS. 12A to 12D are tables showing driving parameters in each vibration mode for vibrating the piezoelectric element in the single-lens reflex digital camera according to the embodiment of the present invention;

DESCRIPTION OF THE EMBODIMENT

A preferred embodiment of the present invention will be described in detail below with reference to the accompanying drawings.

Figure 1:
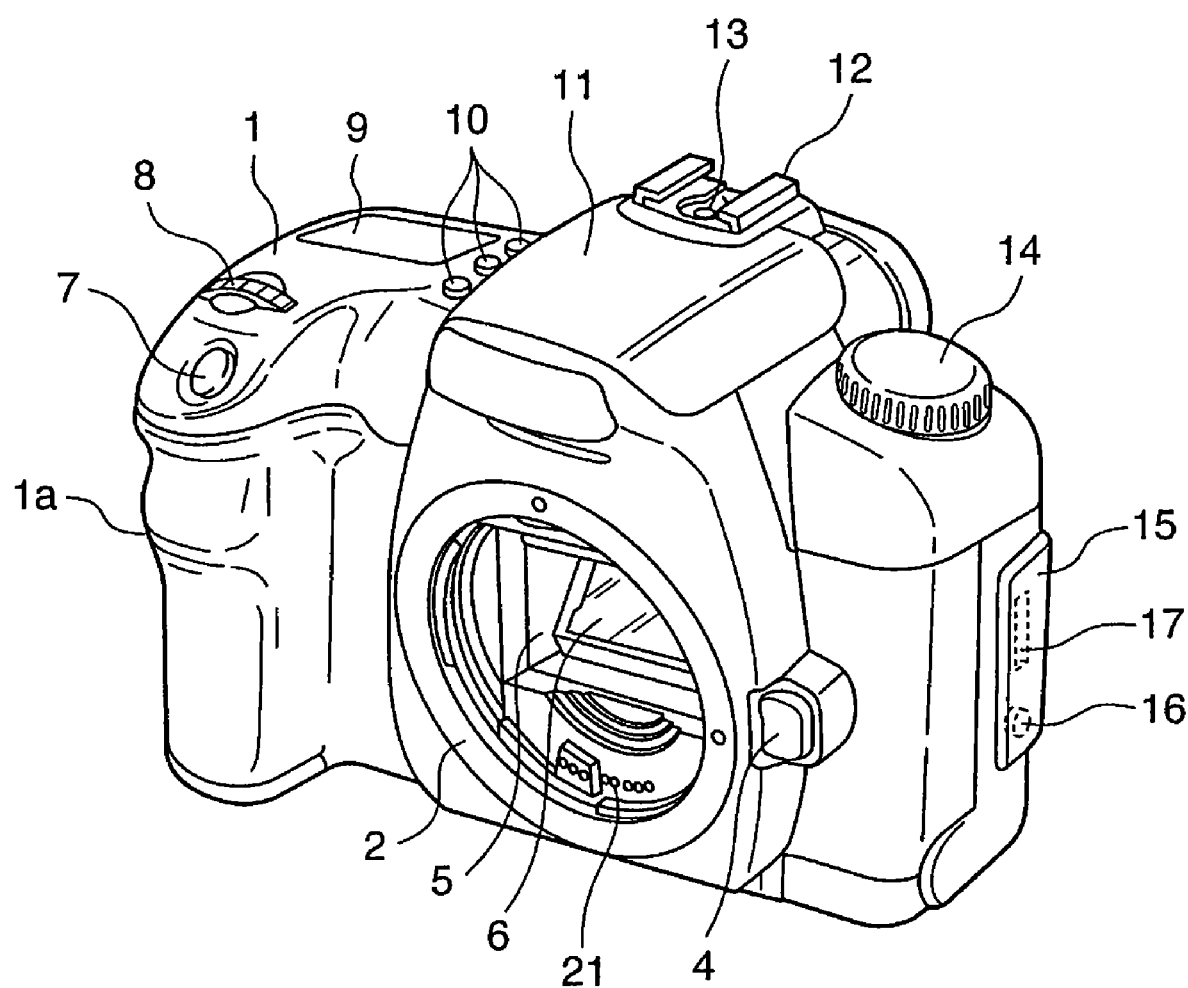
FIG. 1 is a front perspective view showing a single-lens reflex digital camera according to an embodiment of the present invention.
Figure 2:
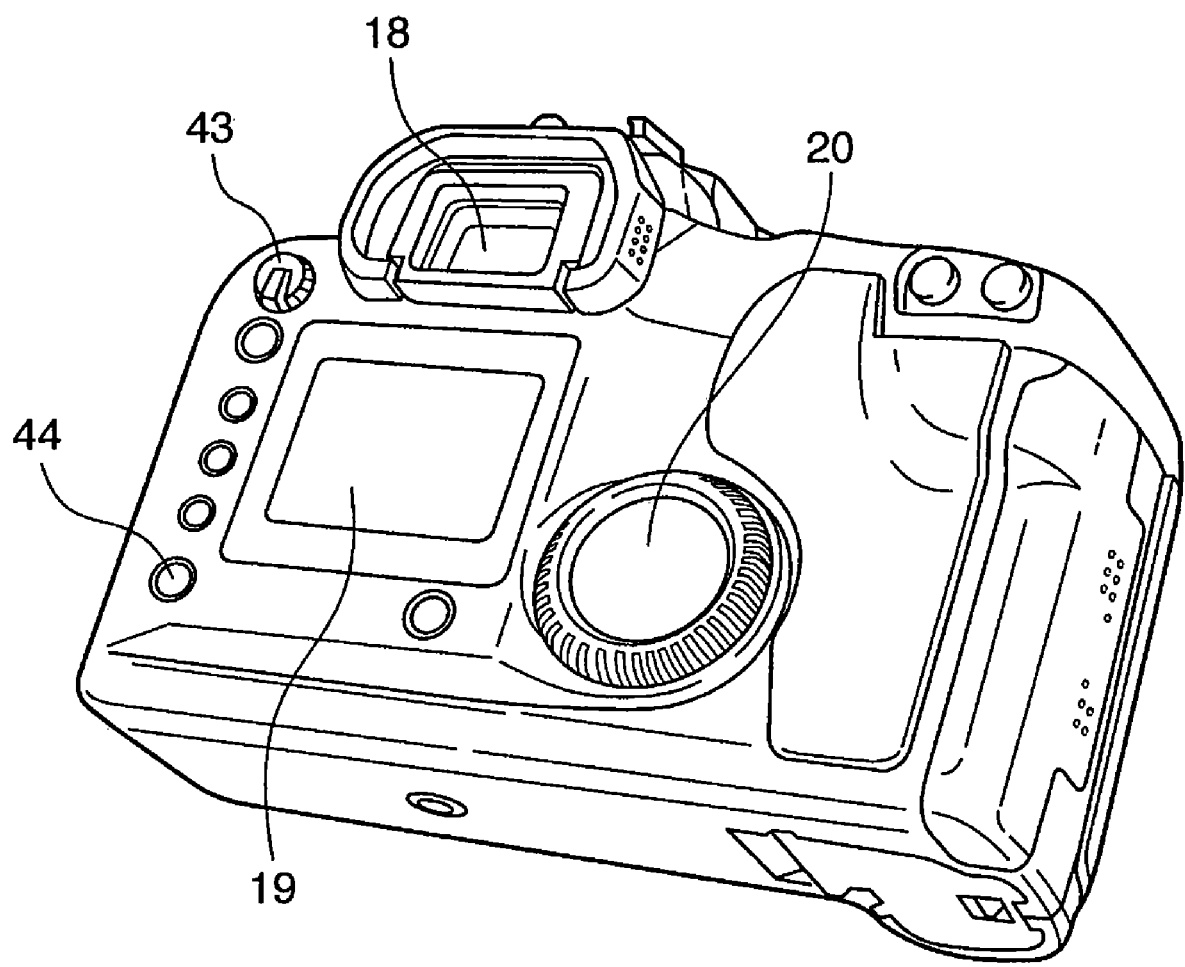
FIG. 2 is a rear perspective view showing the single-lens reflex digital camera according to the embodiment of the present invention.

FIGS. 1 and 2 are perspective views showing the outer appearance of a single-lens reflex digital camera according to an embodiment of the present invention. More specifically, FIG. 1 is a front perspective view of the camera while a photographing lens unit is detached, and FIG. 2 is a rear perspective view of the camera.

Referring to FIG. 1, a camera body 1 has a gripping portion 1a which extends forward such that the user can easily and stably grip the camera in image capture. A mount portion 2 fixes a detachable photographing lens unit (not shown) to the camera body 1. Mount contacts 21 have a function of communicating, e.g., a control signal, status signal, and data signal between the camera body and the photographing lens unit, and supplying power to the photographing lens unit side. The mount contacts 21 may be able to execute not only electrical communication but also optical communication, voice communication, and the like.

A lens lock cancel button 4 is pressed in detaching the photographing lens unit. A mirror box 5 is accommodated in the camera housing. The image capturing light beam having passed through the photographing lens is guided to the mirror box 5. A quick return mirror 6 is placed in the mirror box 5. The quick return mirror 6 can be held at 45° with respect to the image capturing optical axis to guide the image capturing light beam to a pentagonal prism 22 (see FIG. 3A), or held at a position retreated from the image capturing light beam to guide it to an image sensor 33 (see FIG. 3A).

On the gripping side at the upper portion of the camera, a shutter button 7 serving as an activation switch for starting image capture, a main operation dial 8 for setting the shutter speed and lens F-number in accordance with the operation mode in image capture, and an operation mode set button 10 for the image capturing system are provided. An LCD display panel 9 displays some of the operation results of these operation members.

The shutter button 7 turns on a switch SW1 denoted by reference numeral 7a (to be described later) by the first stroke (when pressed halfway), and turns on a switch SW2 denoted by reference numeral 7b (to be described later) by the second stroke (when pressed fully).

The operation mode set button 10 serves to, e.g., set whether to execute continuous shooting or image capture of one frame when the shutter button 7 is pressed once, and set a self image capture mode. The LCD display panel 9 displays these setting states.

At the center of the upper portion of the camera, an electronic flash unit 11 which pops up from the camera body, a shoe groove 12 for electronic flash attachment, and an electronic flash contact 13 are arranged. An image capture mode setting dial 14 is arranged on the right side of the upper portion of the camera.

An openable/closable external terminal lid 15 is arranged on the side surface opposite to the gripping side. A video signal output jack 16 and USB output connector 17 are accommodated as external interfaces inside the external terminal lid 15.

Referring to FIG. 2, a viewfinder eyepiece window 18 is mounted at the upper portion of the camera on its rear side, and a color liquid crystal monitor 19 which allows image display is set around the center of the rear surface. A sub-operation dial 20 juxtaposed to the color liquid crystal monitor 19 plays an auxiliary role of the function of the main operation dial 8, and is used to, e.g., set the exposure compensation amount relative to an appropriate exposure value calculated by an automatic exposure unit, in an AE mode of the camera. In a manual mode in which the user sets the shutter speed and lens F-number to his/her linking, the main operation dial 8 sets the shutter speed and the sub-operation dial 20 sets the lens F-number. The sub-operation dial 20 is also used to display and select a captured image to be displayed on the color liquid crystal monitor 19.

A main switch 43 activates or deactivates the operation of the camera.

A cleaning instruction operation member 44 activates the cleaning mode and instructs to shake off a foreign substance such as dust adhering on the optical filter. Details of this cleaning mode will be described later.

Figure 3A:
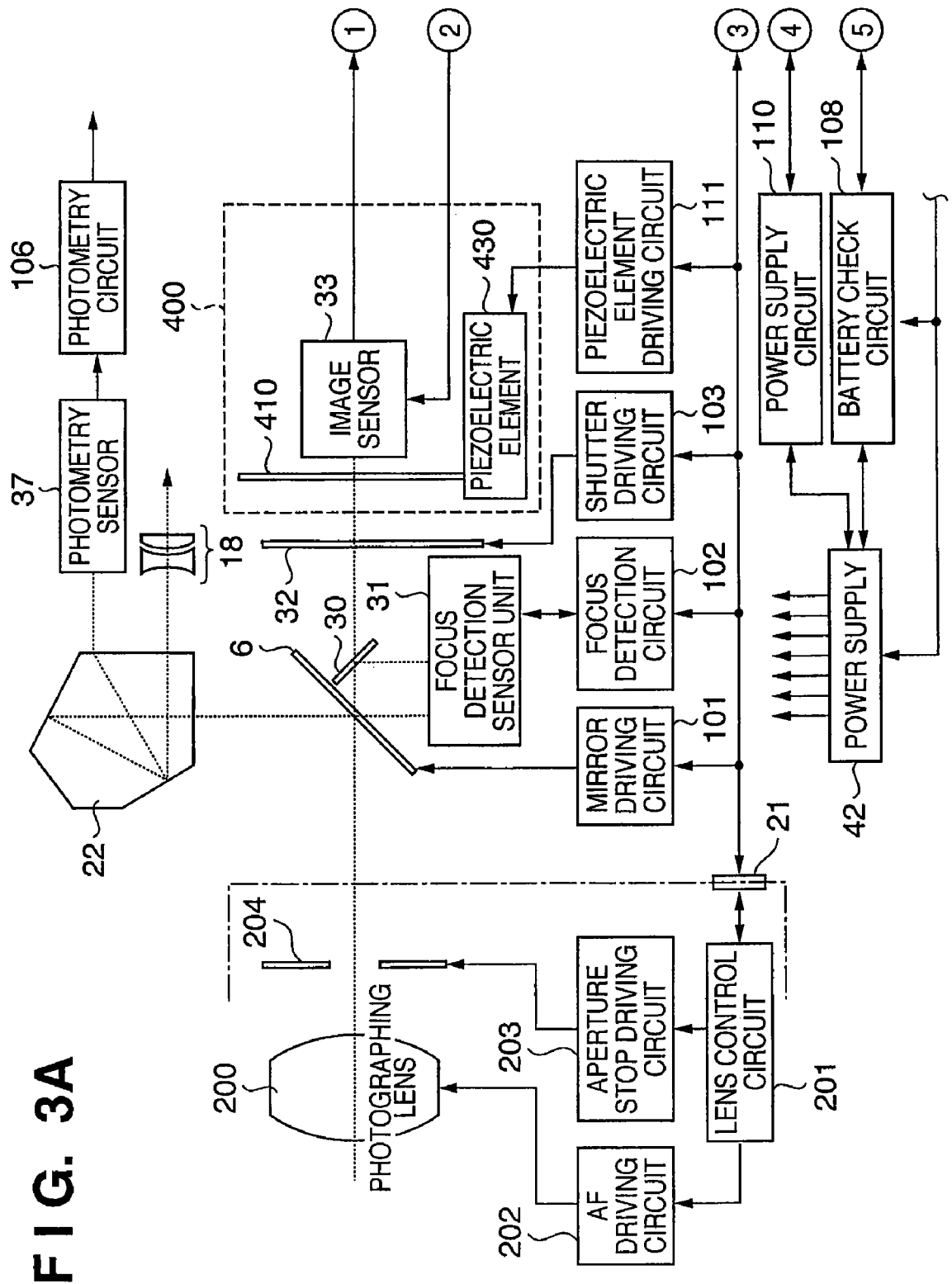
FIGS. 3A and 3B are block diagrams showing the electrical arrangement of the single-lens reflex digital camera according to the embodiment of the present invention.
Figure 3B:
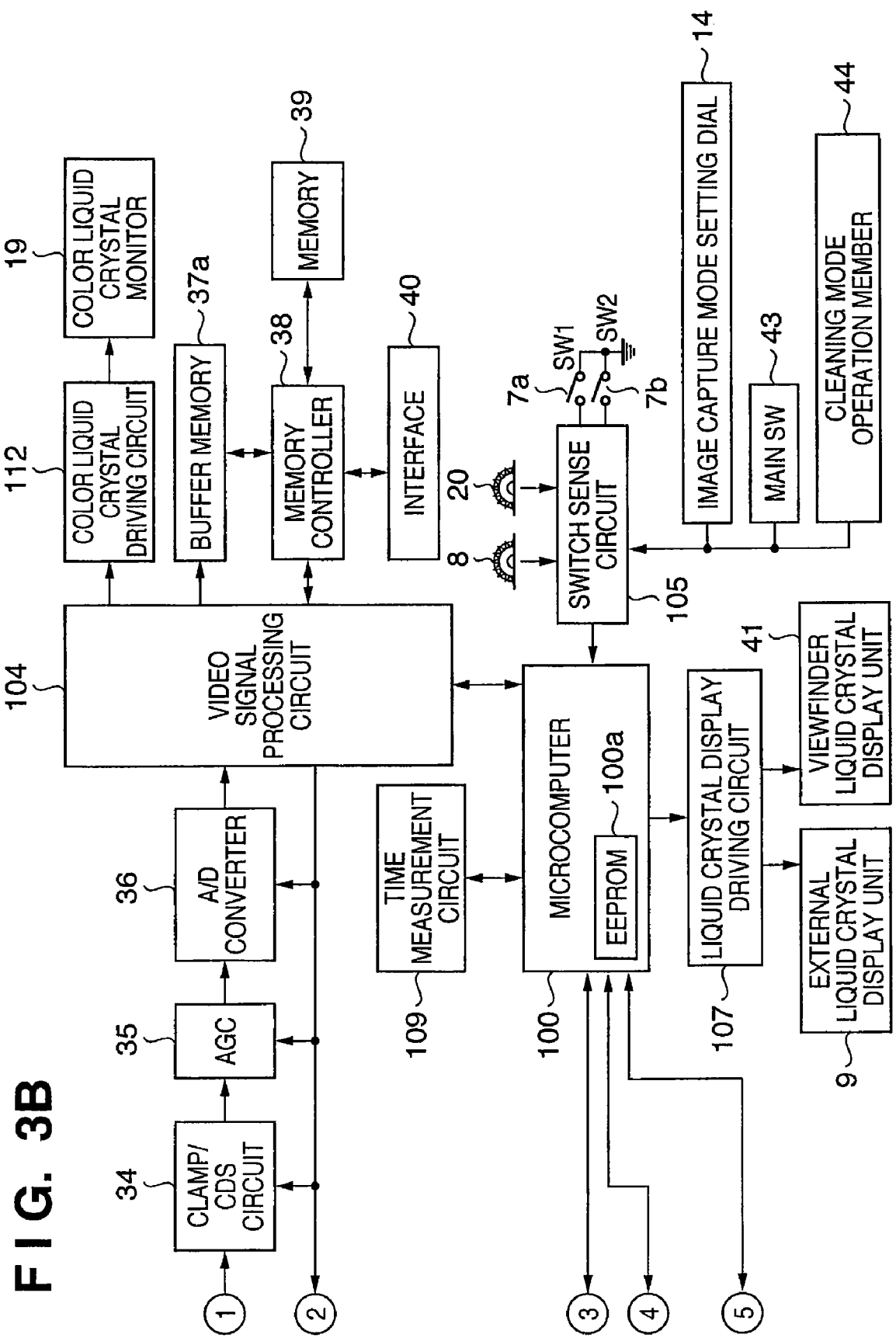

FIGS. 3A and 3B are block diagrams showing the major electrical arrangement of the single-lens reflex digital camera according to this embodiment. The same reference numerals as in the drawings described above denote the common constituent components in FIGS. 3A and 3B.

A central processing unit (to be referred to as an MPU hereinafter) 100 includes a microcomputer built in the camera body 1. The MPU 100 executes various kinds of processes and instructions for the constituent components to control the operation of the camera.

An EEPROM 100a is built in the MPU 100 and can store time measurement information of a time measurement circuit 109 and other information.

The MPU 100 connects to a mirror driving circuit 101, focus detection circuit 102, shutter driving circuit 103, video signal processing circuit 104, switch sense circuit 105, photometry circuit 106, LCD driving circuit 107, battery check circuit 108, the time measurement circuit 109, a power supply circuit 110, and piezoelectric element driving circuit 111. These circuits operate under the control of the MPU 100.

The MPU 100 communicates, via the mount contacts 21, with a lens control circuit 201 built in the photographing lens unit. The mount contacts 21 also have a function of transmitting a signal to the MPU 100 upon being connected to the photographing lens unit. With this operation, the lens control circuit 201 communicates with the MPU 100 to be able to drive a photographing lens 200 and aperture stop 204 in the photographing lens unit via an AF driving circuit 202 and aperture stop driving circuit 203.

Although the photographing lens 200 is shown as one lens in this embodiment for the sake of convenience, it is formed from a large number of lenses in practice.

The AF driving circuit 202 includes, e.g., a stepping motor, and focuses the image capturing light beam on the image sensor 33 by changing the focus lens position in the photographing lens 200 under the control of the lens control circuit 201. The aperture stop driving circuit 203 includes, e.g., an auto iris, and obtains the optical F-number by changing the aperture stop 204 using the lens control circuit 201.

The quick return mirror 6 guides the image capturing light beam passing through the photographing lens 200 to the pentagonal prism 22, and partially transmits and guides it to a submirror 30. The submirror 30 guides the transmitted image capturing light beam to a focus detection sensor unit 31.

The mirror driving circuit 101 drives the quick return mirror 6 to a position at which the object image is observable via the viewfinder and to a position retreated from the image capturing light beam. At the same time, the mirror driving circuit 101 drives the submirror 30 to a position at which the image capturing light beam is guided to the focus detection sensor unit 31 and to a position retreated from the image capturing light beam. More specifically, the mirror driving circuit 101 includes, e.g., a DC motor and gear train.

The focus detection sensor unit 31 of a known phase difference scheme includes a field lens and reflecting mirror that are arranged near the imaging plane (not shown), a secondary imaging lens, an aperture stop, and a line sensor including a plurality of CCDs. The signal output from the focus detection sensor unit 31 is supplied to the focus detection circuit 102 and converted into an object image signal. The resultant signal is transmitted to the MPU 100. The MPU 100 executes a focus detection arithmetic operation using a phase difference detection method on the basis of the object image signal. The MPU 100 calculates the defocus amount and defocus direction. On the basis of the calculated defocus amount and defocus direction, the MPU 100 drives the focus lens in the photographing lens 200 to the in-focus position via the lens control circuit 201 and AF driving circuit 202.

The pentagonal prism 22 serves as an optical member for converting the image capturing light beam reflected by the quick return mirror 6 into an erect image and reflecting it. The user can observe the object image from the viewfinder eyepiece window 18 via the viewfinder optical system.

The pentagonal prism 22 also partially guides the image capturing light beam to a photometry sensor 37. Upon receiving the output from the photometry sensor 37, the photometry circuit 106 converts it into a luminance signal in each area on the observation plane, and outputs the luminance signal to the MPU 100. The MPU 100 calculates the exposure value from the obtained luminance signal.

A mechanical focal plane shutter 32 shields the image capturing light beam while the user observes the object image via the viewfinder. In image capture, the focal plane shutter 32 obtains a predetermined exposure time from the traveling time difference between front blades and rear blades (not shown) in accordance with a release signal. The shutter driving circuit 103 controls the focal plane shutter 32 upon receiving the command from the MPU 100.

The image sensor 33 uses a CMOS serving as, e.g., an image capturing device. The image capturing device may take various forms such as a CCD, CMOS, and CID.

A clamp/CDS (Correlated Double Sampling) circuit 34 can execute a fundamental analog process before A/D conversion and change the clamp level. An AGC (Automatic Gain Controller) 35 can execute a fundamental analog process before A/D conversion and change the AGC basic level. An A/D converter 36 converts the analog output signal from the image sensor 33 into a digital signal.

An optical filter 410 is formed by bonding and stacking a plurality of phase plates and a plurality of birefringent plates made of quartz and further bonding them to an infrared cut filter. In this embodiment, the optical filter 410 integrates an infrared cut filter and an optical low-pass filter made of, e.g., quartz. However, the present invention is not limited to this. The optical filter 410 may have a plurality of separate optical element members. In this case, a piezoelectric element (to be described later) vibrates an optical element which forms a sealed structure including the image sensor and is arranged on its outermost surface.

The piezoelectric element driving circuit 111 vibrates a piezoelectric element 430 upon receiving the command from the MPU 100. The piezoelectric element 430 and optical filter 410 vibrate integrally. An image capturing unit 400 is obtained by unitizing the optical filter 410, piezoelectric element 430, and image sensor 33 together with other components (to be described later). The detailed structure of the image capturing unit 400 will be described later.

For digital image data, the video signal processing circuit 104 executes general image processes using hardware, such as a gamma/Knee process, a filter process, and an information composition process for monitor display. Via a color liquid crystal driving circuit 112, the color liquid crystal monitor 19 displays the image data for monitor display from the video signal processing circuit 104.

The video signal processing circuit 104 can also store image data in a buffer memory 37a via a memory controller 38 in accordance with the instruction from the MPU 100. The video signal processing circuit 104 also has an image data compression function using, e.g., JPEG. In continuous image capture such as continuous shooting, it is also possible to temporarily store image data in the buffer memory 37a and sequentially read out unprocessed image data via the memory controller 38. The video signal processing circuit 104 can sequentially execute an image process and compression process irrespective of the rate of image data input from the A/D converter 36.

The memory controller 38 also has a function of causing a memory 39 to store image data input from an external interface 40 (equivalent to the video signal output jack 16 and USB output connector 17 shown in FIG. 1), and a function of causing the external interface 40 to output the image data stored in the memory 39. The memory 39 is, e.g., an electronic flash memory detachable from the camera body.

The switch sense circuit 105 transmits an input signal to the MPU 100 in accordance with the operation status of each switch. The switch SW1 7a is turned on by the first stroke (half pressing) of the shutter button 7. The switch SW2 7b is turned on by the second stroke (full pressing) of the shutter button 7. As the shutter button 7 turns on the switch SW2, an image capture start instruction is transmitted to the MPU 100. The switch sense circuit 105 connects to the main operation dial 8, sub-operation dial 20, image capture mode setting dial 14, main switch 43, and cleaning instruction operation member 44.

The liquid crystal display driving circuit 107 drives the LCD display panel 9 or a viewfinder liquid crystal display unit 41 in accordance with the instruction from the MPU 100.

The battery check circuit 108 checks the battery for a predetermined period of time in accordance with the signal from the MPU 100, and transmits the detection output to the MPU 100. A power supply unit 42 supplies necessary power to the constituent components of the camera.

The time measurement circuit 109 measures the date and the time from when the main switch 43 is turned off until it is turned on at the next time. The time measurement circuit 109 can transmit the measurement result to the MPU 100 in accordance with the command from the MPU 100.

The detailed structure of the image capturing unit 400 will be explained with reference to FIGS. 4 to 9D.

Figure 4:
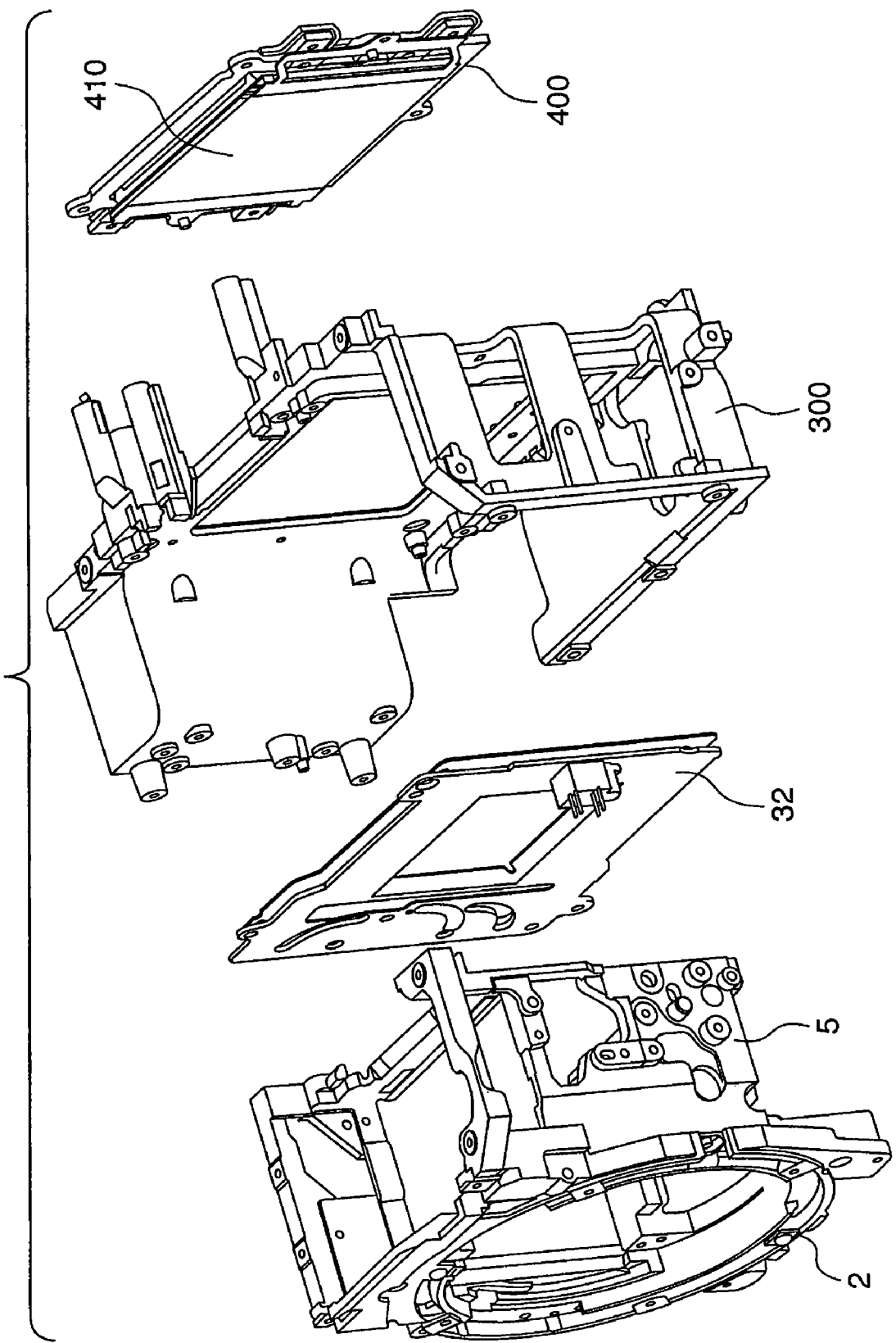
FIG. 4 is an exploded perspective view showing the holding structure around an optical low-pass filter and image sensor in the single-lens reflex digital camera according to the embodiment of the present invention.

FIG. 4 is an exploded perspective view showing the outline of the internal structure of the camera, for explaining the holding structure around the image capturing unit 400 which comprises the optical filter 410 and image sensor 33.

The mirror box 5 and shutter unit 32 are provided on the object side of a main body chassis 300 serving as the framework of the camera body in the order named from the object side. The image capturing unit 400 is provided on the photographer side. The image capturing unit 400, in particular, is adjusted and fixed such that the image sensing plane of the image sensor 33 becomes parallel to the attachment surface of the mount 2, which serves as a reference with which the photographing lens unit is attached, at a predetermined distance.

Figure 5:
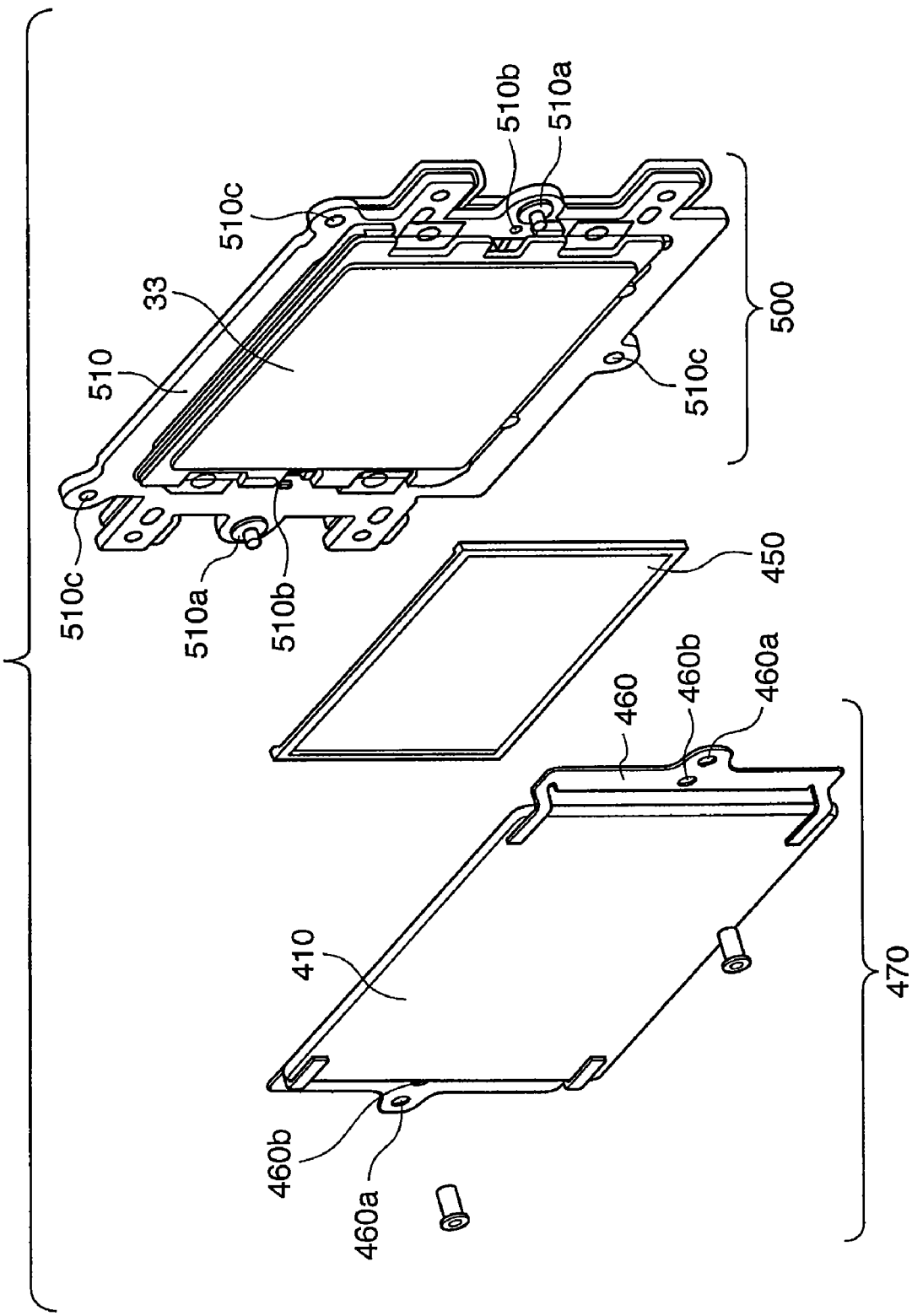
FIG. 5 is a perspective view showing the structure of an image capturing unit in the single-lens reflex digital camera according to the embodiment of the present invention.

FIG. 5 is a perspective view showing the structure of the image capturing unit 400. The image capturing unit 400 comprises a vibration unit 470, image sensor unit 500, and frame member 450. The image sensor unit 500 comprises at least the image sensor 33 and an image sensor holding member 510. The vibration unit 470 comprises the optical filter 410, piezoelectric element 430 (see FIG. 3A), and a biasing member 460. The biasing member 460 is made of a material such as a metal that exhibits spring characteristics, and is provided with positioning holes 460a and clearance holes 460b to fix with screws. The image sensor holding member 510 is provided with positioning pins 510a and screw holes 510b.

Using the positioning holes 460a of the biasing member 460 and the positioning pins 510a of the image sensor holding member 510, the vibration unit 470 is positioned with respect to the image sensor unit 500. Using the screw clearance holes 460b of the biasing member 460 and the screw holes 510b of the image sensor holding member 510, the vibration unit 470 is fixed to the image sensor unit 500 by screws through the frame member 450. The surface of the frame member 450 on the object side abuts against the optical filter 410, while the surface of the frame member 450 on the photographer side abuts against the image sensor 33. The vibration unit 470 is biased toward the image sensor unit 500 by the spring characteristics of the biasing member 460 to bring the frame member 450 into tight contact with the optical filter 410 without any space between them. This also brings the frame member 450 into tight contact with the image sensor 33 without any space between them. Hence, the frame member 450 seals the interval between the optical filter 410 and the image sensor 33 to form a sealed space to prevent the entrance of a foreign substance such as dust.

Figure 6:
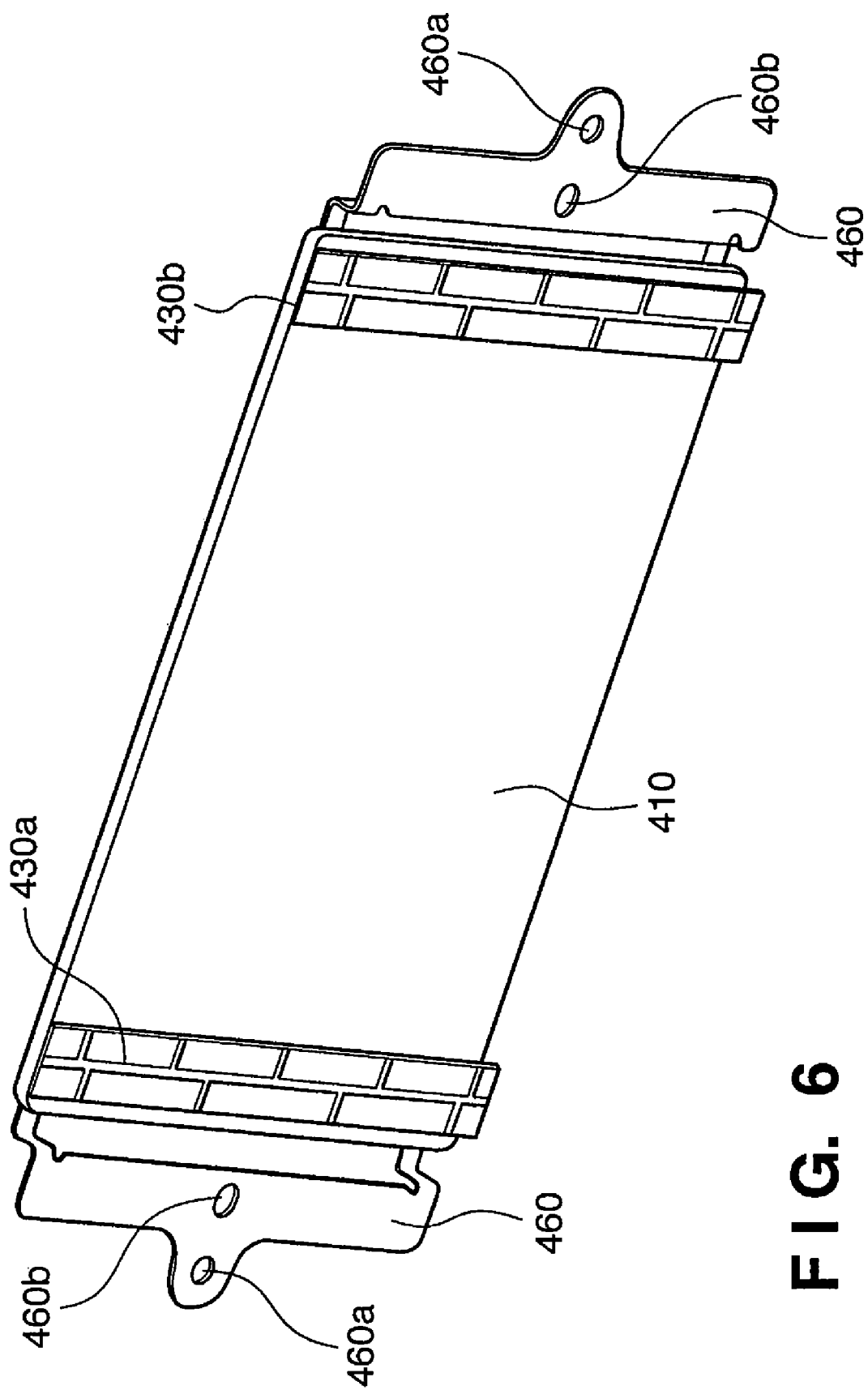
FIG. 6 is a perspective view showing the detailed structure of a vibration unit in the single-lens reflex digital camera according to the embodiment of the present invention.

FIG. 6 is a perspective view showing the detailed structure of the vibration unit 470.

Referring to FIG. 6, piezoelectric elements 430a and 430b are fixed at the ends of the optical filter 410 by, e.g., an adhesive. In this embodiment, a total of two piezoelectric elements 430a and 430b having the same shape are fixed to the two ends of the optical filter 410. The biasing member 460 is fixed to the optical filter 410 by, e.g., an adhesive.

Figures 7A, 7B, 7C:
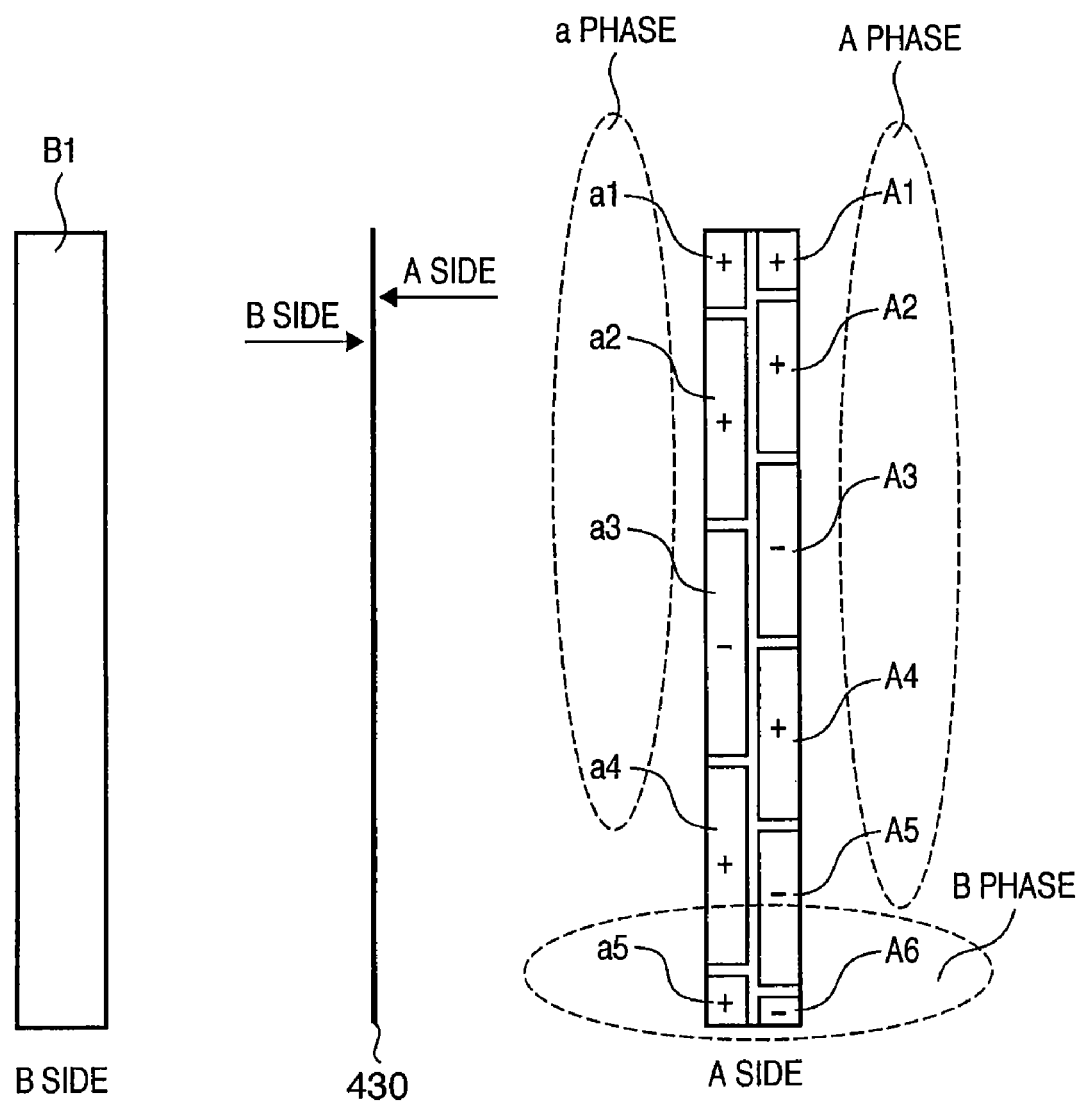
FIGS. 7A to 7C are views showing details of a piezoelectric element in the single-lens reflex digital camera according to the embodiment of the present invention.

FIGS. 7A to 7C are views showing details of the piezoelectric element 430a or 430b. FIG. 7B is a side view of the piezoelectric element 430a or 430b. FIG. 7A is a plan view when the piezoelectric element 430a or 430b shown in FIG. 7B is seen from left. FIG. 7C is a plan view when the piezoelectric element 430a or 430b shown in FIG. 7B is seen from right.

As shown in FIGS. 7B and 7C, the A surface of the piezoelectric element 430a is divided at the center into an a phase to excite bending vibration of the fifth mode in the optical filter 410 and an A layer to excite bending vibration of the sixth mode in the optical filter 410. Each phase has electrodes divided at a pitch of λ/2 (λ is the wavelength) of bending vibration. Each electrode is polarized in the thickness direction of the piezoelectric element 430. Each of positive and negative signs on the electrode indicates its polarization direction. Except for electrodes a1, A1, a5, and A6 at the ends of the A side, adjacent electrodes are polarized to have opposite polarities. As shown in FIGS. 7A and 7B, an electrode B1 is formed on the entire surface of the B side of the piezoelectric element 430.

A conductive material (not shown), for example, electrically connects electrodes a1 to a4 to maintain them at the same potential (a phase electrodes). Electrodes A1 to A5 are maintained at the same potential (A phase electrodes). Electrodes a5, A6, and B1 are maintained at the same potential (B phase electrodes). The A side electrically, mechanically connects to a conductive connecting member (not shown) such as a flexible printed board to be able to independently apply predetermined voltages to the a phase electrodes, A phase electrodes, and B phase electrodes. The B side of the piezoelectric element 430 is fixed to the optical filter 410 by, e.g., an adhesive so that the piezoelectric element 430 and optical filter 410 move integrally.

The vibration mechanism and shape of the optical filter 410 will be explained with reference to FIGS. 8A and 8B and 9A to 9D.

The deformation of the piezoelectric element 430 when a predetermined positive voltage is applied to the a phase electrode (or A phase electrode) of the piezoelectric element 430 via a conductive connecting member (not shown), while the B phase electrode has the ground potential (0 V), will be described.

Figure 8A:
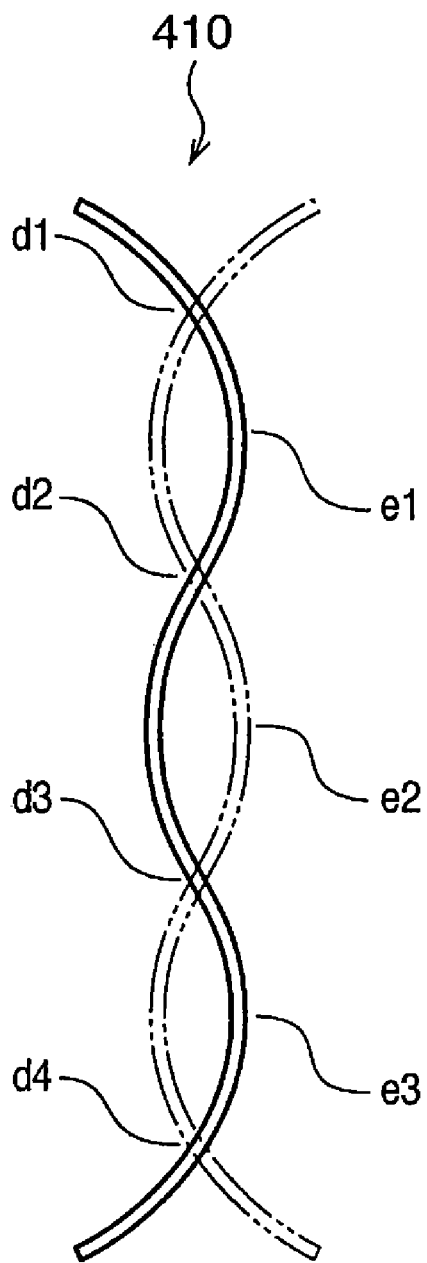
FIGS. 8A and 8B are side views each showing the vibration shape of the optical filter.
Figure 8B:
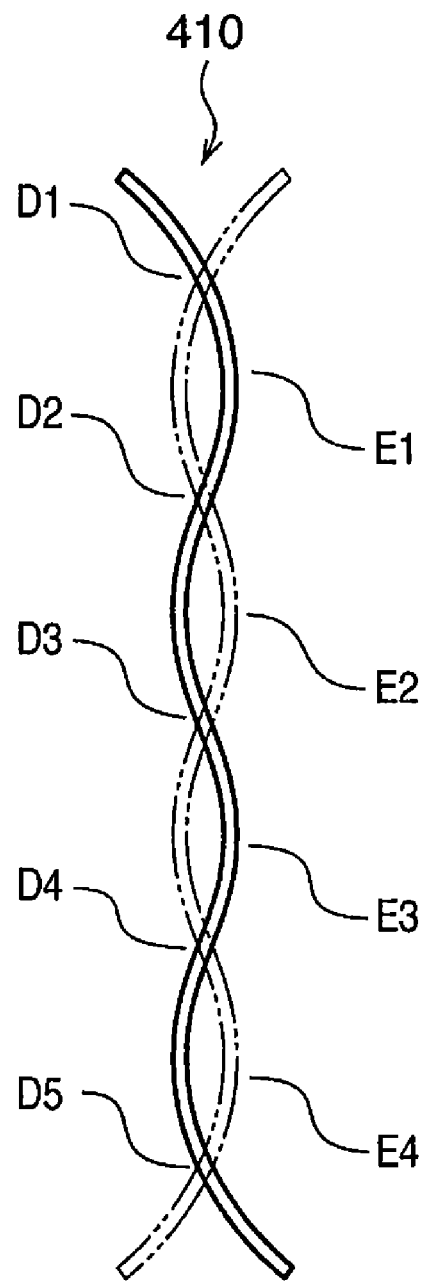
Figure 9A:
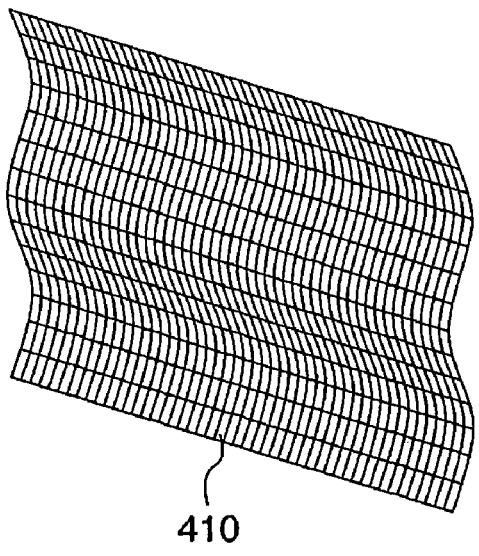
FIGS. 9A to 9D are perspective views each showing the vibration shape of the optical filter.
Figure 9B:
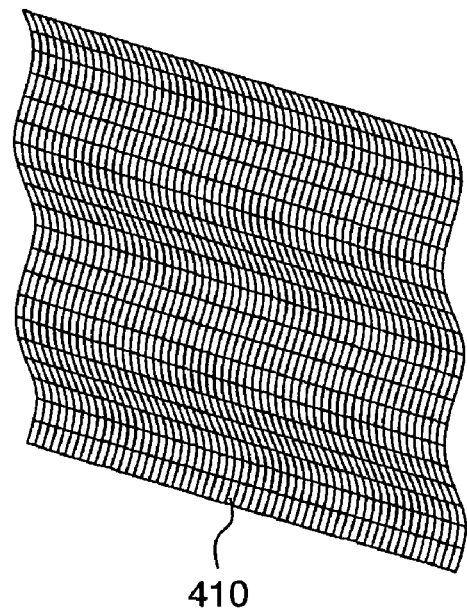

FIGS. 8A and 8B are side views each showing the vibration shape of the optical filter 410. FIGS. 9A to 9D are perspective views each showing the vibration shape of the optical filter 410. FIGS. 8A and 9A each show the vibration shape of the optical filter 410 when it vibrates in the fifth mode. FIGS. 8B and 9B each show the vibration shape of the optical filter 410 when it vibrates in the sixth mode. FIGS. 8A and 8B and 9A to 9D exaggerate the bending state of the optical filter 410 to explain the vibration shape.

Upon receiving the above-described voltage, the portions of the piezoelectric element 430a which are indicated by positive signs in FIG. 7C contract in a direction perpendicular to the plane and expand in the in-plane direction. The optical filter 410 bonded to the piezoelectric element 430a receives a force that expands the bonding surface in the in-plane direction from the piezoelectric element 430a, and deforms such that the surface of the optical filter 410 bonded to the piezoelectric element 430a forms a convex. Similarly, the portions of the piezoelectric element 430a which are indicated by negative signs in FIG. 7C expand in a direction perpendicular to the plane and contract in the in-plane direction. The optical filter 410 bonded to the piezoelectric element 430 shown in FIGS. 7A to 7C receives a force that contracts the bonding surface in the in-plane direction from the piezoelectric element 430, and deforms such that the surface of the optical filter 410 bonded to the piezoelectric element 430a forms a concave.

When the above-described voltage is applied to the a phase electrode, bending deformation of the fifth mode as indicated by a solid line in FIG. 8A occurs. When the above-described voltage is applied to the A phase electrode, bending deformation of the sixth mode as indicated by a solid line in FIG. 8B occurs. Bending deformation of the sixth mode as indicated by a solid line in FIG. 8B acts on the optical filter 410.

When a predetermined negative voltage is applied to the a or A phase electrode, the piezoelectric element 430 expands/contracts in a direction opposite to that described above. Bending deformation as indicated by broken lines in FIGS. 8A and 8B acts on the optical filter 410.

That is, when the sign of a predetermined voltage applied to the a phase electrode (or A phase electrode) is periodically switched to positive and negative while the B phase electrode is kept at the ground potential, bending vibration acts on the optical filter 410 to periodically switch its concavity and convexity. Setting the frequency of this periodical voltage to the vicinity of the resonance frequency of the optical filter 410 in the natural vibration mode makes it possible to attain a large amplitude with a lower voltage. In other words, it is possible to efficiently remove dust or the like adhering on the optical filter 410 with lower power consumption. As shown in FIGS. 8A and 8B, bending vibration in the optical filter 410 exhibits its nodes d1 to d4 and D1 to D5 and its antinodes e1 to e3 and E1 to E4. The amplitude of the vibration node becomes almost zero. Since the amplitude of the vibration node is zero, it is impossible to remove a foreign substance such as dust adhering. In this case, generating bending vibration in a plurality of modes having different node positions makes it possible to remove the dust throughout the entire image capturing field.

Figure 9C:
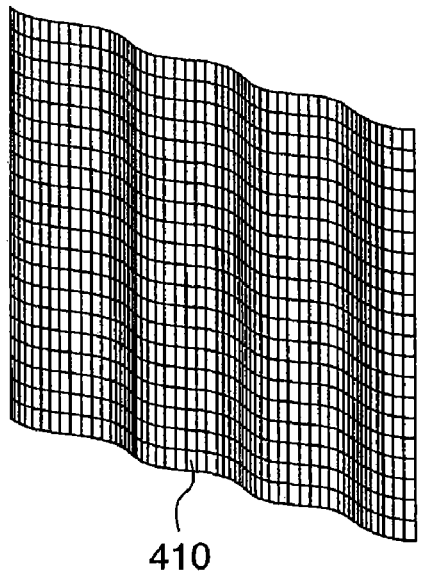
Figure 9D:
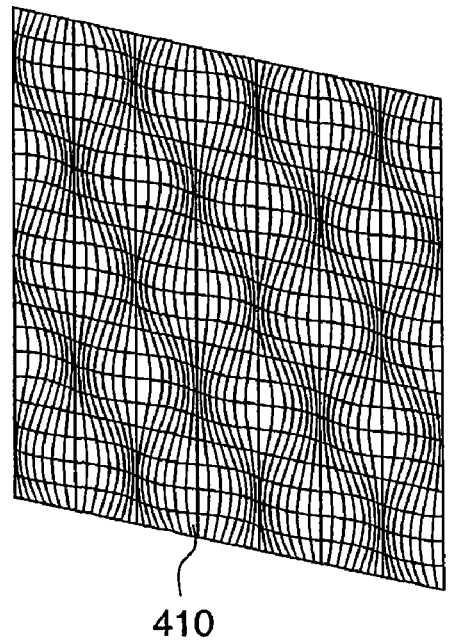

The resonance frequency of the optical filter 410 in the natural vibration mode changes depending on, e.g., its shape, thickness, and material. The optical filter 410 has not one but a plurality of resonance frequencies in the natural vibration mode. The vibration shapes shown in FIGS. 9A and 9B are examples of the resonance frequency of the optical filter 410. Changing the frequency of a voltage applied to the piezoelectric element 430 also makes it possible to form complicated shapes as shown in FIGS. 9C and 9D. Moreover, the amplitude and acceleration of the optical filter 410 change depending on the frequency of an applied voltage. In other words, the vibration mode which causes a resonance frequency at which specific dust adhering on the optical filter 410 is most likely to separate from the surface of the optical filter 410 changes depending on the size and position of the dust.

At a specific resonance frequency, there is even a mode at which the optical filter resonates at a higher frequency even though the amplitude is small. In such a vibration mode, the amplitude can be increased by raising the applied voltage while maintaining the frequency of the applied voltage at the same level.

As described above, the piezoelectric elements 430a and 430b are arranged on the left and right sides of the optical filter 410 in this embodiment. The relationship between the vibration shape, amplitude, and acceleration changes even by shifting the phases of the frequencies of voltages applied to the left and right piezoelectric elements.

Figure 10:
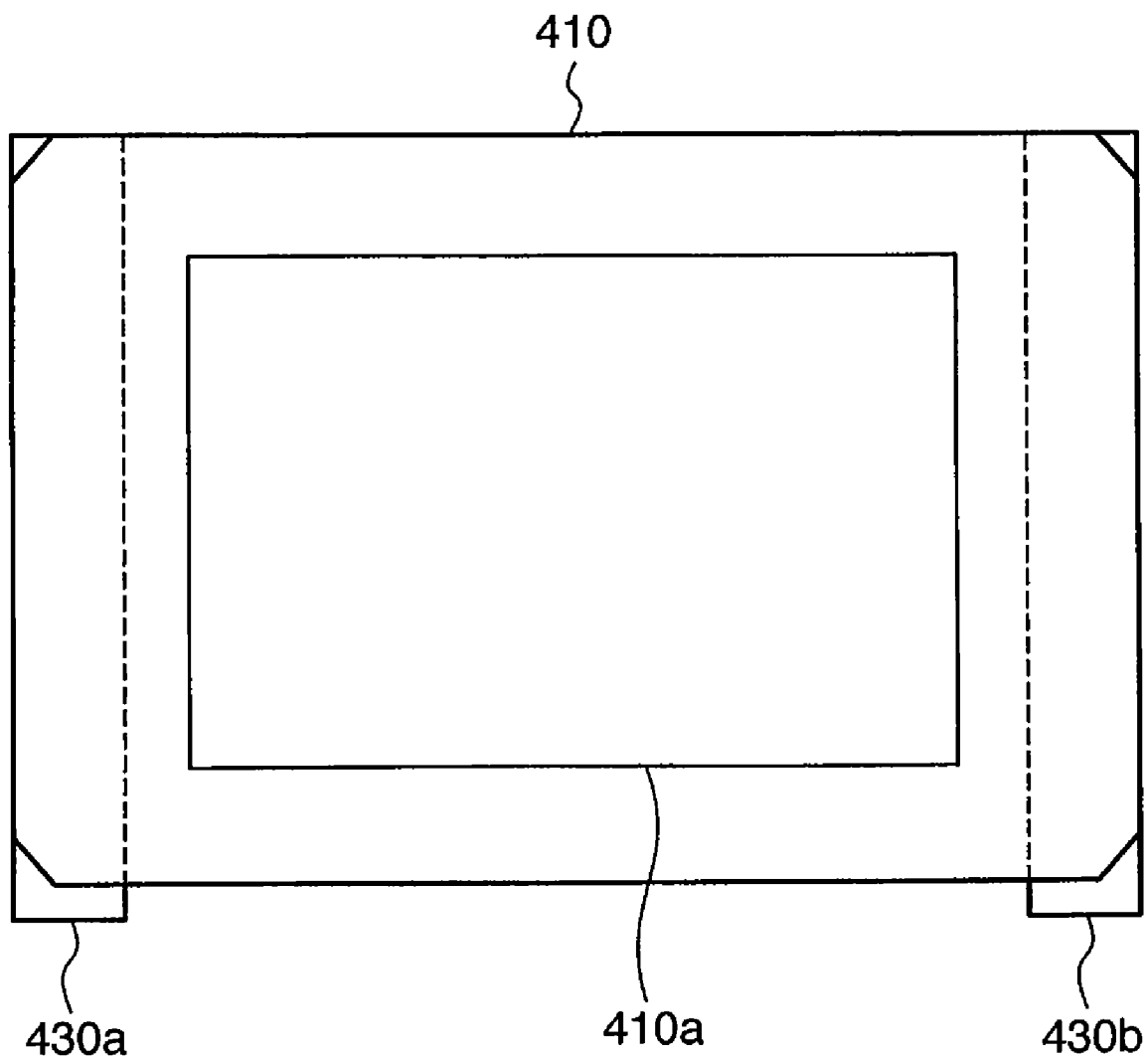
FIG. 10 is a front view when the vibration unit in the single-lens reflex digital camera according to the embodiment of the present invention is seen from the photographing lens side.

FIG. 10 is a front view showing the optical filter 410 and piezoelectric elements 430a and 430b of the vibration unit 470 shown in FIG. 6 from the side of the photographing lens 200.

Referring to FIG. 10, a region 410a corresponds to the light-receiving range of a photo-electric conversion element of the image sensor 33, which is arranged on the rear side of the optical filter 410. That is, when the user takes an image while dust or the like is adhering on the surface within the light-receiving range region 410a, the image sensor senses the shadow of the dust.

FIG. 11 is a view illustrating an example in which the light-receiving range region 410a of the optical filter 410 is divided into a predetermined number of subregions having a predetermined size in advance.

Referring to FIG. 11, the light-receiving range region 410a is divided into 216 subregions by division into 18 subregions (H-1, H-2, . . . , H-17, and H-18 from left) in the horizontal direction and division into 12 subregions (V-1, V-2, . . . , V-11, and V-12 from above) in the vertical direction.

As explained with reference to FIGS. 8A and 8B and 9A to 9D, the vibration shape, displacement amplitude, and acceleration of the surface of the optical filter 410 change depending on the position even when the piezoelectric element 430 is driven at the same voltage (V), AC frequency (f), and phase angle (θ). That is, the 216 subregions (H-1, V-1), (H-1, V-2), . . . , (H-18, V-11), and (H-18, V-12) of the light-receiving range region 410a have different displacement amplitudes (D) and accelerations (G). Even within the same subregion, the maximum displacement amplitude (Dmax) and maximum acceleration (Gmax) change upon changing the phase angle (θ), the AC frequency (f), and the voltage (V) applied to the piezoelectric elements 430a and 430b.

FIGS. 12A to 12D are tables showing driving parameters in each vibration mode for vibrating the piezoelectric element 430.

FIG. 12A shows the voltage (V) serving as a driving parameter in each vibration mode. In this embodiment, a voltage of one out of four, i.e., 30 V, 40 V, 50 V, and 60 V is selectively applied. FIG. 12B shows the frequency (KHz) serving as a driving parameter in each vibration mode. In this embodiment, a frequency of one out of five, i.e., 20 KHz, 50 KHz, 80 KHz, 100 KHz, and 130 KHz is selectively driven. FIG. 12C shows the phase angle (rad) of the input voltage from the piezoelectric element 430a to the piezoelectric element 430b. In this embodiment, one out of four, i.e., 0 rad, 90 rad, 180 rad, and 270 rad is selectively driven.

FIG. 12D shows combinations of the voltage (V), frequency (KHz), and phase angle (rad) shown in FIGS. 12A, 12B, and 12C, which bring about a maximum displacement amplitude (Dmax) for each of the 216 subregions of the light-receiving range region 410a. FIG. 12D also shows combinations of the voltage (V), frequency (KHz), and phase angle (rad), which bring about a maximum acceleration (Gmax). A nonvolatile memory in the MPU 100 shown in FIG. 3B stores these driving parameters to automatically select driving parameters used for vibration, in accordance with the result of a dust detection process (to be described later).

The number of divided subregions of the light-receiving range region 410a, the setting values of the respective driving parameters, and combinations of the driving parameters in this embodiment are not limited to those described above.

Figure 13:
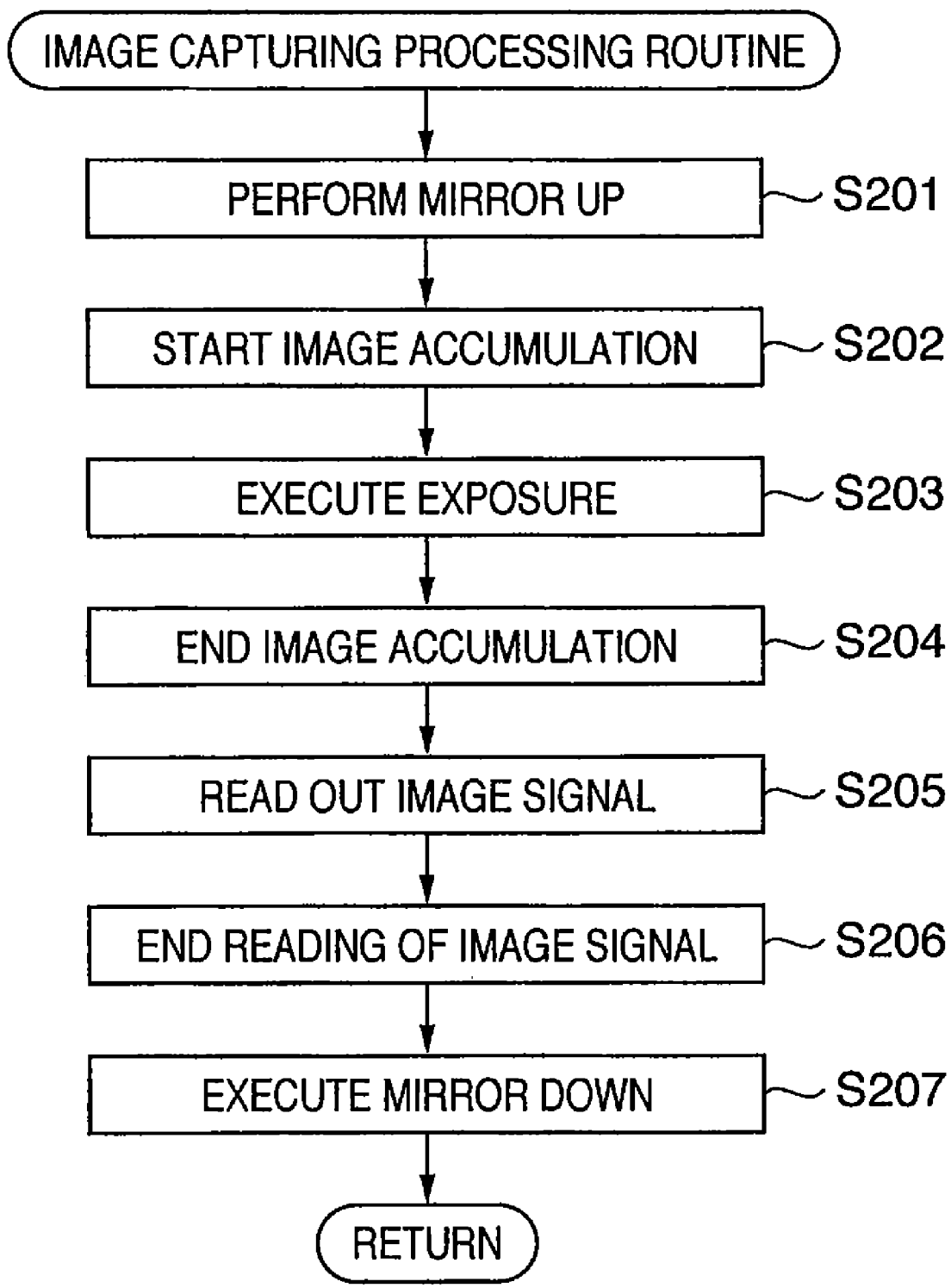
FIG. 13 is a flowchart for explaining an image capturing processing routine in the single-lens reflex digital camera according to the embodiment of the present invention.

An image capturing processing routine performed in step S24 of FIG. 14 will be explained in detail with reference to the flowchart shown in FIG. 13. This process is done by causing the MPU 100 to execute an image capturing processing program stored in the nonvolatile memory (not shown).

As this image capturing processing routine is executed, the MPU 100 activates the quick return mirror 6 and submirror 30 shown in FIG. 3A in step S201 to perform so-called mirror up so that the quick return mirror 6 retreats outside the image capturing optical path.

In step S202, the image sensor 33 starts charge accumulation. In step S203, front blades and rear blades (not shown) in the shutter 32 travel to perform exposure. In step S204, the image sensor 33 ends charge accumulation. In step S205, an image signal is read out from the image sensor 33 to cause the A/D converter 36 and video signal processing circuit 104 to process the image data. The buffer memory 37 temporarily stores the processed image data.

After all the image signals are read out from the image sensor 33 in step S206, the quick return mirror 6 changes to so-called mirror down in step S207. The quick return mirror 6 then returns to a position (oblique position) to guide the object light to the viewfinder optical system to complete a series of image capturing operations.

Figure 14:
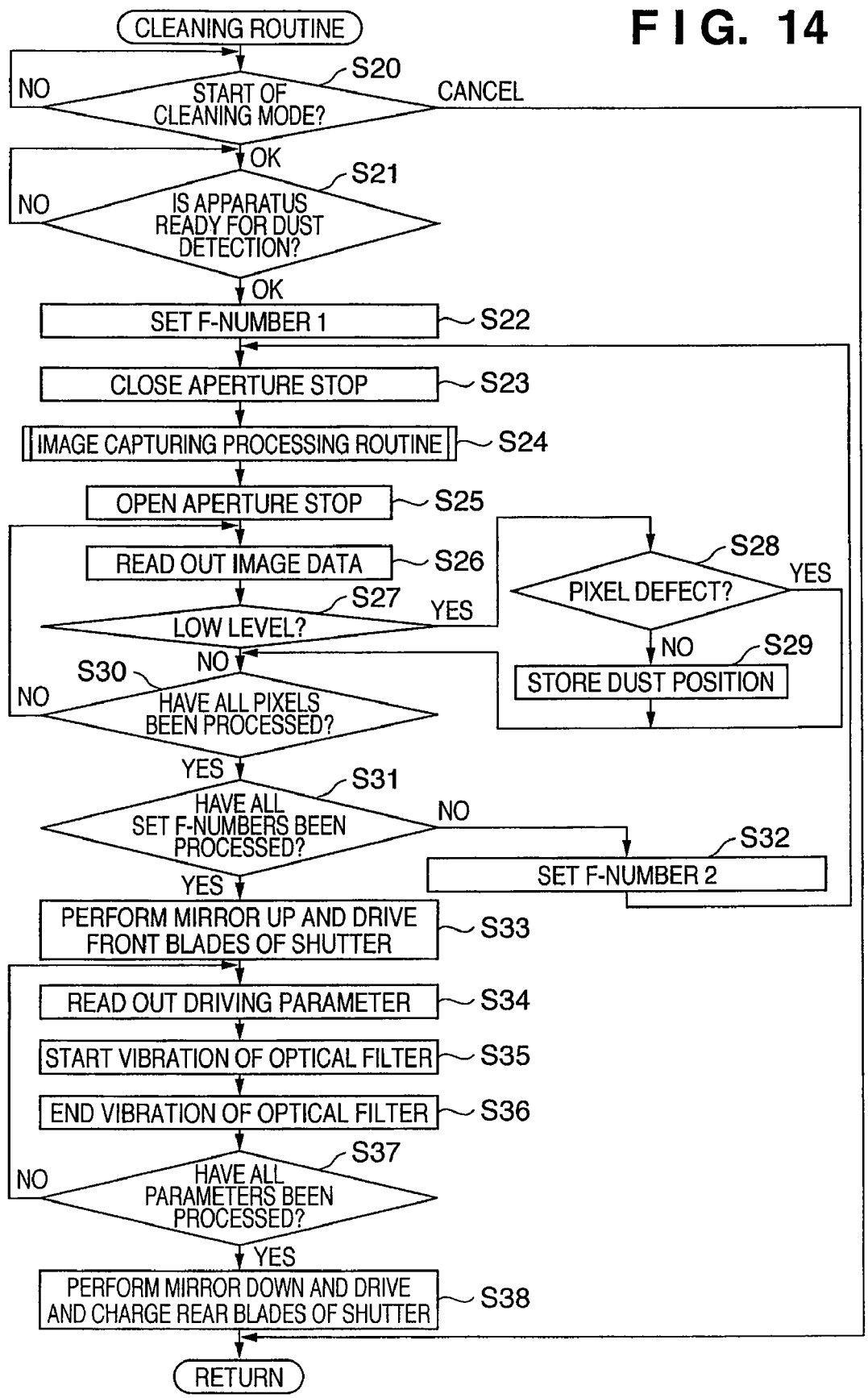
FIG. 14 is a flowchart for explaining a cleaning routine in the single-lens reflex digital camera according to the embodiment of the present invention.

FIG. 14 is a flowchart for explaining a cleaning routine in the single-lens reflex digital camera according to this embodiment.

In this embodiment, a dust detection process (a process of detecting the pixel position suffering an image error due to the presence of dust) using a dust detection image will be explained as an example of a dust position identification means for specifying the position of the dust adhering on the surface of the optical filter 410.

This process is done by executing a dust detection processing program stored in the nonvolatile memory in the MPU 100.

More specifically, in the cleaning routine, "cancel" and "OK" buttons are displayed on the color liquid crystal monitor 19 as selection items to start cleaning when the user operates the cleaning instruction operation member 44. The user can select these selection items by operating the sub-operation dial 20.

When the shutter button 7 is pressed halfway to turn on the switch SW1 7a while cleaning start "cancel" is focused on, the cleaning routine returns without starting cleaning (step S20). In step S20, the sub-operation dial 20 rotates to focus on the "OK" item. In this state, the release button is pressed halfway to turn on the switch SW1 7a. The process advances to step S21 to start the dust detection process.

The dust detection process is executed by capturing a dust detection image. To prepare for the dust detection, the photographer must set the camera such that the image capturing optical axis of the lens 200 is directed toward a uniform luminance surface such as the exit surface of a surface light source unit. Alternatively, he/she must mount a dust detection light unit (a small-sized surface light source unit mounted on the front surface of the lens) on the lens 200.

For this purpose, in step S21, the color liquid crystal monitor 19 displays, on its screen, the above-described preparation operation for the photographer. At the same time, the color liquid crystal monitor 19 instructs the photographer to confirm whether he/she is ready to take an image. More specifically, if he/she is ready to take an image, the shutter button 7 is pressed halfway to turn on the switch SW1 7a. The process advances to step S22.

This embodiment will exemplify a case in which a normal photographing lens is used. However, a unit for illuminating the image sensor 33 with a uniform luminance via an aperture stop unit may be attached to the lens mount 2 to execute dust detection. In this embodiment, the dust detection image has a uniform luminance.

Upon receiving an operation instruction message indicating that he/she is ready to take an image, the MPU 100 sets the aperture stop in step S22. The imaging state of the dust near the image sensor 33 changes depending on the F-number of the aperture stop 204. To accurately detect the position and size of the dust, it is desirable to execute dust detection with a plurality of F-numbers. First of all, the MPU 100 sets F-number 1, i.e., a predetermined F-number corresponding to the thickness (the distance between the dust adhesion place and the image sensor) of the protective glass and optical filter which are arranged on the image sensor 33. For example, F-number 1 is set to F8.

The MPU 100 causes the lens control circuit 201 to control the F-number of the photographing lens 200 to set the aperture stop to "F-number 1" (or "F-number 2" set in step S32) set in step S22 (step S23). At the start of processing, the aperture stop has the F-number set in step S22.

As the aperture stop 204 of the photographing lens 200 is set to the predetermined value, an image is captured in a dust detection mode and developed (step S24). Details of the image capturing processing routine are the same as those explained with reference to FIG. 13. The buffer memory 37 stores the captured image data.

When image capture is complete, the MPU 100 controls the lens control circuit 201 to set the aperture stop of the photographing lens 200 to a full-aperture value (step S25).

Data corresponding to each pixel position in the captured image stored in the image buffer memory 37 is sequentially invoked to the video signal processing circuit 104 (step S26).

The video signal processing circuit 104 compares the value of the invoked pixel data with a preset threshold level (step S27).

When dust adheres on the image sensor 33, the amount of light that enters a pixel corresponding to the dust adhesion position decreases. Comparing the individual image data with the preset threshold level makes it possible to detect a pixel suffering an image error. Note that when external light enters the camera body in the process of dust position detection, the value of data obtained from a pixel error may become higher than the threshold level. It is therefore necessary to prevent the external light from entering the camera body. Furthermore, if a uniform luminance surface is unavailable in image capture, not only the threshold level of luminance but also the difference with a neighboring pixel output may be used for determination.

If the value of readout pixel data is lower than the threshold level, the position of the readout pixel data is compared with the position of a pixel error (pixel defect) from the manufacture, which is stored in a pixel defect position memory in advance, to confirm whether the readout pixel data is a pixel defect (step S28).

Only if it is determined that no pixel defect is concerned, the EEPROM 100a built in the MPU 100 registers the position (dust adhesion position) of the dust pixel (step S29).

The dust position data detected using F-number 1 set in step S22 is defined as dust position data 1.

After that, all the pixels undergo the same determination process (steps S26 to S29). If all the pixels have been processed (YES in step S30), it is determined whether all the F-numbers to be detected have undergone the dust detection process (step S31). If an unprocessed F-number is present (NO in step 31), the process branches to step S32. If all the F-numbers have been processed (YES in step S31), the process advances to step S33.

Since the dust normally adheres not on the surface of the image sensor 33 but on the protective glass or optical filter, the imaging state of the dust changes depending on the F-number of the photographing lens. That is, when the aperture stop has an F-number close to a full-aperture value, small dust, if any, has little influence because its image blurs. In contrast, as the F-number increases, the dust image is clearly formed and has significant influence on the entire image.

In view of this, another F-number (F-number 2 such as F22) is set (step S32). The process returns to step S23 to capture an image again and execute the dust detection process. The dust position data detected with F-number 2 is defined as dust position data 2. The processing operation from step S23 to step S31 is executed. When all dust position data corresponding to a plurality of F-numbers can be detected, this dust detection routine ends. Although dust detection is executed with the two F-numbers in this flowchart, dust detection with a larger number of F-numbers makes it possible to more accurately generate dust position data. Using the generated data allows more accurate dust detection.

With the processing operation from step S21 to step S32, the position of dust or the like adhering on the surface of the optical filter 410 is automatically detected from the dust detection image. After that, the processing operation subsequent to step S33 is executed as a dust removal operation.

In step S33, the quick return mirror 6 and submirror 30 shown in FIG. 3A changes to mirror up and the front blades in the shutter 32 is driven to make the front curtain travel. The process advances to step S34.

In step S34, the MPU 100 determines driving parameters used for vibration, in accordance with the dust position data registered by the above-described dust detection process, and reads out the determined driving parameters. More specifically, as described with reference to FIGS. 10 and 11, a divided predetermined subregion of the light-receiving range region 410a is collated with the dust position data information. The MPU 100 reads out driving parameters of a voltage (V), frequency (KHz), and phase angle (rad) for generating a maximum acceleration (Gmax) corresponding to an appropriate subregion shown in FIG. 12D.

In most cases, a plurality of dust position data are stored, so driving parameters are calculated and stored for each dust position data. The same driving parameter is sometimes obtained even for different dust position data depending on the circumstance. In this case, vibration driving is performed later under one condition. Although driving parameters for generating a maximum acceleration (Gmax) are calculated in this embodiment, driving parameters for generating a maximum displacement amplitude (Dmax) may be used. This is because not a high acceleration but a large amplitude often makes it easy to remove the dust depending on its size.

In step S35, the MPU 100 controls the piezoelectric element driving circuit 111 shown in FIG. 3A to apply a predetermined voltage, frequency, and phase angle to the piezoelectric elements 430a and 430b for each driving parameter read out in step S34. The piezoelectric elements 430a and 430b expand/contract in accordance with the driving parameters, and the optical filter 410 connected to them performs bending vibration to be able to remove the dust adhering on its surface.

In step S36, the MPU 100 controls the piezoelectric element driving circuit 111 after the elapse of a predetermined time to stop driving the piezoelectric element 430. The optical filter 410 then stops bending vibration.

In step S37, all the driving parameters stored in step S34 undergo the same processing operations (steps S34 to S36). After that, it is determined whether all the driving parameters stored in step S34 have been processed. If all the driving parameters have been processed, the process advances to step S38.

In step S38, the rear blades in the shutter 32 are driven to close the rear curtain to change the quick return mirror 6 and submirror 30 to mirror down. For the next image capturing operation, a shutter charge operation (an operation for returning the shutter to a release ready state as before image capture) is done to complete a series of operations.

As has been described above, according to this embodiment, it is possible to automatically detect, from the dust detection image, the position of dust or the like adhering on the surface of the optical filter 410. However, the present invention is not limited to this. The photographer himself/herself may designate the dust position using a cursor key or designation button by displaying the dust detection image on the color liquid crystal monitor 19. In this case, the dust detection image need not always be an image having a uniform luminance as in this embodiment, and may be an image captured using a normal photographing lens.

According to this embodiment, it is possible to generate optimal vibration within a predetermined range on the optical filter that has an influence on the captured image, in accordance with the position and size of the dust. This makes it possible to accurately and efficiently remove the dust within a short period of time without increasing the apparatus size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-170579, filed Jun. 20, 2006, which is hereby incorporated by reference herein in its entirety.

What is claimed is:

1. An image capturing apparatus comprising:
   an image sensor which photo-electrically converts an object image;
   an optical element inserted between the image sensor and a photographing optical system which forms the object image;
   a foreign substance position storage unit which stores a position of a foreign substance adhering on a surface of the optical element;
   a vibration unit which vibrates the optical element to remove the foreign substance adhering on the surface of the optical element; and
   a control unit which controls a driving parameter of the vibration unit on the basis of the foreign substance position information stored in the foreign substance position storage unit,
   wherein the control unit controls positions of nodes of a vibration that occurs at the optical element in the case when the vibration unit vibrates the optical element, by controlling the driving parameter.

2. The apparatus according to claim 1, further comprising a foreign substance position detection unit to detect a position of a foreign substance adhering on the surface of the optical element,
   wherein the foreign substance position storage unit stores position information of the foreign substance detected by the foreign substance position detection unit.

3. The apparatus according to claim 2, wherein the foreign substance position detection unit detects, from information about a sensed image obtained from the image sensor, the position of the foreign substance adhering on the surface of the optical element.

4. The apparatus according to claim 1, wherein the control unit controls at least one of a driving frequency and driving voltage serving as parameters for driving the vibration unit, on the basis of the foreign substance position information stored in the foreign substance position storage unit.

5. The apparatus according to claim 4, wherein the vibration unit comprises a plurality of piezoelectric elements, and the control unit controls a phase difference between driving voltages applied to the plurality of piezoelectric elements, on the basis of the foreign substance position information stored in the foreign substance position storage unit.

* * * * *